United States Patent [19]

Hamelin

[11] 3,861,760

[45] Jan. 21, 1975

[54] MONITORING AND PROTECTING CIRCUIT FOR AN ELECTRONIC BRAKING SYSTEM

[75] Inventor: Gilbert Hamelin, Marly La Ville, France

[73] Assignee: Societe Anonyme D.B.A., Paris, France

[22] Filed: Oct. 23, 1973

[21] Appl. No.: 408,345

[30] Foreign Application Priority Data
Nov. 3, 1972  France .............................. 72.38935

[52] U.S. Cl. .......................... 303/21 AF, 340/52 B
[51] Int. Cl. .............................................. B60t 8/08
[58] Field of Search ......... 180/82 R, 105 E; 303/21; 307/10 R, 202, 293, 92, 94; 317/60 A; 340/52 R, 52 B

[56] References Cited
UNITED STATES PATENTS

| | | | |
|---|---|---|---|
| 3,511,329 | 5/1970 | Wisner ................... | 303/21 CF UX |
| 3,535,004 | 10/1970 | Howard et al. ................. | 303/21 EB |
| 3,574,415 | 4/1971 | Stamm ........................... | 303/21 EB |
| 3,674,319 | 7/1972 | Brugger et al. ................. | 303/21 CG |
| 3,740,103 | 6/1973 | Sweet et al. ................ | 303/21 AF X |

Primary Examiner—Trygve M. Blix
Assistant Examiner—Stephen G. Kunin
Attorney, Agent, or Firm—Ken C. Decker; William N. Antonis

[57] ABSTRACT

A monitoring and protecting circuit for an electronic antiskid braking system of a vehicle having a plurality of wheels, each wheel having a speed sensor unit providing a direct-current speed signal representative of the rotational speed of this wheel. The circuit includes means for selecting the speed signal having the higher level, apparatus for selecting the speed signal having the lowest level and apparatus for comparing these levels. The output of the comparing apparatus is transmitted through time-delay apparatus to a switching device controllable for inhibiting the operation of the antiskid braking system, whereby this system is inhibited when the comparing apparatus delivers an output for a time duration exceeding a predetermined amount. Apparatus are provided for preventing the inhibition of the antiskid braking system when the brakes of the vehicle are being applied, and when the discrepancies between the rotational velocities of the wheels are due to skidding during acceleration of the vehicle above a predetermined rate.

3 Claims, 1 Drawing Figure

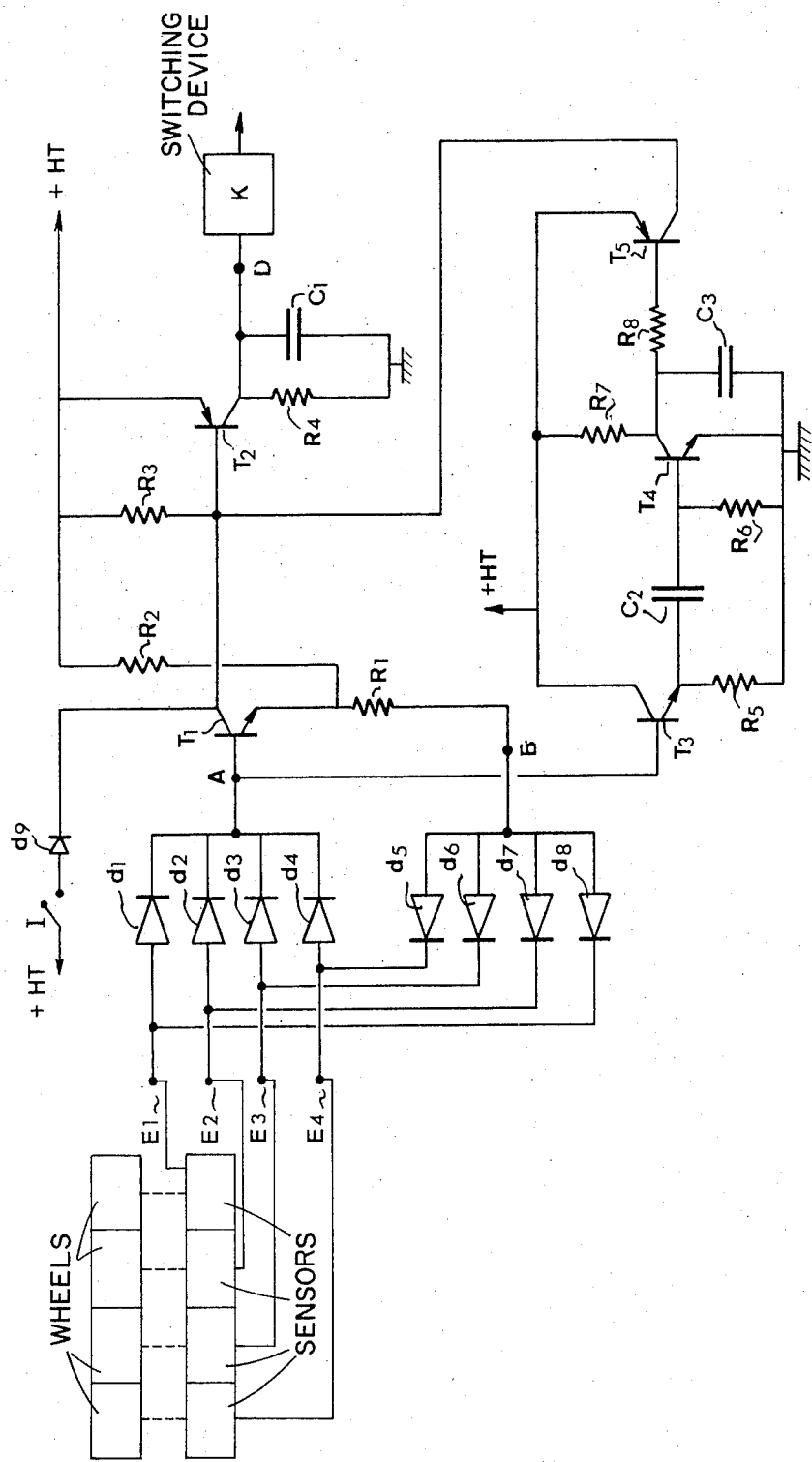

MONITORING AND PROTECTING CIRCUIT FOR AN ELECTRONIC BRAKING SYSTEM

The invention relates to a monitoring and protecting circuit for an electronic anti-skid braking system of a vehicle having a plurality of wheels, each wheel having a speed sensor unit providing a direct-current speed signal representative of the rotational speed of this wheel.

In an electronic anti-skid braking system of this type, the signals from the speed sensors may on occasion be abnormal, particularly as a result of mechanical misadjustment of the electromagnetic sensing devices or due to skidding of the driven wheels of the vehicle. Such anomalies in the output signals from the sensors may lead to dangerous losses of braking.

To overcome these disadvantages, the invention proposes a monitoring and protecting circuit for an electronic braking system of the type described, comprising first selector means selecting the highest of the speed signals, second selector means selecting the lowest of the speed signals, means for comparing the highest and the lowest speed signals, providing an output signal when the difference between the highest and lowest speed signals exceeds a given threshold, and time-delayed switching device responsive to the output signal and switching off the electronic braking system when the output signal lasts longer than a predetermined amount of time.

Preferably, the output of the comparing means is also connected to the brake light switch of the vehicle, so as to block the action of the output signal during every braking operation.

In addition the monitoring and protecting circuit may comprise a differentiator circuit, supplied with the highest speed signal and operating a threshold element followed by time-delay means, the latter inhibiting the output signal for a given duration from the instant at which the threshold element is set off.

The invention will now be described by way of example with reference to the accompanying drawing in which the single FIGURE illustrates a circuit embodying the invention.

In the single FIGURE, E1 to E4 designate the input terminals of the monitoring circuit as a whole. The input terminals are connected to respective conventional speed sensor units (not shown), which feed to E1 to E4 direct-current signals, assumed to be positive, each signal being representative of the rotational speed of one wheel of a vehicle (not shown).

The terminals E1 to E4 are connected to respective pairs of to diodes $d1$ and $d8$, $d2$ and $d7$, $d3$ and $d6$, and $d4$ and $d5$. The diodes in each pair are arranged head-to-tail, the cathode of one diode and anode of the other being connected respectively to a point A and to a point B. Point A is connected to the base of an NPN transistor T1, whose emitter is connected through a resistor R1 to the point B. The emitter of the transistor T1 is also connected to a positive voltage + by way of a resistor R2, and its collector is connected to the positive voltage + by way of a resistor R3. A PNP transistor T2 has its emitter connected to the positive voltage +, its base connected to the collector of the transistor T1, and its collector, designated by a point D, earthed by way of a parallel resistance/capacitor network R4/C1. A switching device K responsive to the signals appearing at the point D is controllable to inhibit the operation of an electronic anti-skid braking system (not shown).

The collector of the transistor T1 is also connected through a diode $d9$ to a brake light switch I, which includes a terminal connected to the positive voltage +.

The point A is connected to the base of a NPN transistor T3, which has its collector connected to the positive voltage + and its emitter earthed by way of a resistor R5. The emitter of the transistor T3 is also connected to the base of a NPN transistor T4 by way of a capacitor C2, a resistor R6 being provided between the base of the transistor T4 and the earth. The emitter of the transistor T4 is itself earthed, and its collector is connected to the positive voltage + by way of a resistance R7. Lastly, the collector of the transistor T4 is earthed by way of a capacitor C3 and is connected to the base of a PNP transistor T5 by way of a resistor R8. The emitter of this transistor T5 is connected to the positive voltage +, and its collector is connected directly to the base of the transistor T2.

The circuit illustrated in the FIGURE operates as follows.

When the vehicle is travelling on a straight road with released brakes, and also when the speed sensor units (not shown) are correctly adjusted, the speed signals appearing at E1 to E4 are equal, and the same therefore applies to the output signals from the "SELECT HIGH" diode array $d1$ to $d4$ and to the output voltage from the "SELECT LOW" diode array $d5$ to $d8$. The transistor T1 is therefore non-conducting and no signal appears at its collector. The switching device K occupies then the condition in which it allows the anti-skid braking system to operate.

When the vehicle is turning with released brakes, a slight speed difference occurs between the various wheels (of the order of 10 to 15 km/h at most) and produces between the points A and B a low voltage too small to switch the transistor T1. In this case the electronic anti-skid braking system is still allowed to operate.

If, on the other hand, unbraked travel of the vehicle is accompanied by a fault in at least one of the speed sensor units or some other fortuitous effect, the voltage difference between A and B may become such that, allowing for the voltage division carried out by R1 and R2, the switching threshold of the transistor T1 (about 0.6 volts) is reached. This transistor therefore conducts, and a voltage drop occurs at its collector when it switches. This voltage drop in turn switches the transistor T2, which results in the application of a positive voltage, delayed by the time-delay circuit R4/C1, to the terminal D. The transistor T2 is in fact connected as an inverter amplifier. The time-delay circuit R4/C1, set for example at 0.2 secs., prevents a transitory difference between the wheel speeds from causing the operation of the switching device K. If the difference continues longer than the delay time of the network R4/C1, the signal at D causes the switching device K to shift into its condition in which it prevents the anti-skid braking system from operating.

When the vehicle is being braked during travel, and if the anti-skid braking system intervenes, the wheel speeds may of course be appreciably different from one another, which would almost inevitably cause immediate operation of the switching device K. To prevent this, the brake light switch I of the vehicle causes the collector of the transistor T1 to be connected to the positive voltage + by way of the diode $d9$ as soon as braking begins, so switching off the transistor T2 and thereby preventing the switching device K from operating.

Lastly, a mode of operation may occur when the vehicle is accelerating and the driven wheels are skidding. In this case, since the speed differences detected by the "SELECT HIGH" and "SELECT LOW" diode arrays are often above the switching threshold of the transistor T1, the anti-skid braking system would be inhibited, which is undesirable in this case. To prevent this a supplementary protecting circuit is provided, comprising the transistors T3, T4 and T5 and the associated circuits. The transistor T3 and resistor R5 are connected only as an impedance adaptor. The network C2/R6 constitutes a differentiator, the transistor T4 constitutes a threshold detector, and the network R7/C3 forms a time-delay circuit controlling the blocking transistor T5, which in turn controls the transistor T2. The assembly operates as follows. When the driven wheels of the vehicle are skidding during acceleration, the signal at the point A, transmitted by way of the transistor T3 to the network C2/R6, is differentiated, and if the signal appearing at the base of the transistor T4 denotes acceleration of the driven wheels above a given threshold (approximately 1 g), this transistor T4 switches over from the non-conducting state to the conducting state, and the capacitor C3 discharges almost instantaneously to the transistor T4. Assuming that the transistor T4 switches over again rapidly because the acceleration of the driven wheels falls below 1 g, the capacitor C3 recharges slowly by way of the resistor R7. The charging time can be set at about 10 seconds, for example, for which time the transistor T5 remains conductive and therefore applies the positive voltage + to its collector. This positive voltage, acting on the base of the transistor T2, prevents the switching device K from inhibiting the anti-skid braking system. It will be appreciated that in the event of skidding of the driven wheels the circuit comprising the transistors T3, T4 and T5 prevents inhibition of the anti-skid braking system for a given period, selected so that it is greater than the normal duration of skidding of the driven wheels.

I claim:

1. A monitoring and protecting circuit for an electronic anti-skid braking system of a vehicle having a plurality of wheels, each wheel having sensor means generating a direct-current speed signal representative of the rotational speed of said wheel, said electronic anti-skid braking system including switching means controllable to inhibit the operation of the anti-skid braking system, said monitoring and protecting circuit including:

first selector means having a plurality of inputs, each of said inputs being supplied with one of said speed signals, and an output which delivers the speed signal having the highest level;

second selector means having a plurality of inputs, each of said inputs being supplied with one of said speed signals, and an output which delivers the speed signal having the lowest level;

comparing means having inputs connected to the respective outputs of the first and second selector means, and generating an output signal when the difference between said highest and lowest levels exceeds a predetermined quantity;

time delay means receiving said output signal and delivering a signal delayed by a predetermined amount of time;

said delayed signal being transmitted to said switching means for controlling the operation thereof, whereby the operation of the anti-skid braking system is inhibited when said output signal has a duration exceeding said predetermined amount of time, differentiating means generating a signal representative of the rate of change of the speed signal having the highest level;

threshold sensing means energized in response to said rate of change being in excess of a predetermined value;

a time constant circuit responsive to the de-energization of said threshold sensing means and producing a signal having a predetermined duration; and switching means responsive to said signal of predetermined duration for inhibiting the output signal during said duration.

2. A monitoring and protecting circuit according to claim 1, wherein the output of said comparing means is connected to a brake light switch of the vehicle, whereby closure of the brake light switch during every application of the brakes causes the elimination of said output signal generated by said comparing means.

3. A monitoring and protecting circuit according to claim 1, wherein said predetermined duration is much greater than the said predetermined amount of time by which the output signal is delayed.

* * * * *